(12) United States Patent
Yokodo (10) Patent No.: US 12,516,852 B2
(45) Date of Patent: Jan. 6, 2026

(54) CRYOCOOLER AND METHOD FOR OPERATING CRYOCOOLER

(71) Applicant: SUMITOMO HEAVY INDUSTRIES, LTD., Tokyo (JP)

(72) Inventor: Takayuki Yokodo, Nishitokyo (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 263 days.

(21) Appl. No.: 18/497,018

(22) Filed: Oct. 30, 2023

(65) Prior Publication Data

US 2024/0060689 A1 Feb. 22, 2024

Related U.S. Application Data

(63) Continuation of application No. PCT/JP2022/018561, filed on Apr. 22, 2022.

(30) Foreign Application Priority Data

Apr. 30, 2021 (JP) ................................ 2021-077105

(51) Int. Cl.
*F25B 9/14* (2006.01)
*F25B 9/10* (2006.01)

(52) U.S. Cl.
CPC . *F25B 9/14* (2013.01); *F25B 9/10* (2013.01)

(58) Field of Classification Search
CPC .................. F25B 9/06; F25B 9/10; F25B 9/14
See application file for complete search history.

(56) References Cited

U.S. PATENT DOCUMENTS

| | | | | |
|---|---|---|---|---|
| 3,552,120 A | * | 1/1971 | Beale | F02G 1/0435 60/525 |
| 5,009,072 A | | 4/1991 | Nagao | |
| 5,398,512 A | * | 3/1995 | Inaguchi | F25B 9/14 60/520 |
| 5,797,262 A | * | 8/1998 | Omoto | F15B 11/064 60/412 |
| 6,530,237 B2 | | 3/2003 | Morse et al. | |

(Continued)

FOREIGN PATENT DOCUMENTS

| | | |
|---|---|---|
| JP | H03-001053 A | 1/1991 |
| JP | H06-007023 B2 | 1/1994 |

(Continued)

*Primary Examiner* — Filip Zec
(74) *Attorney, Agent, or Firm* — HEA Law PLLC (57) ABSTRACT

A cryocooler includes: an expander capable of executing initial cooling for cooling from an initial temperature to a cryogenic temperature and a steady operation of maintaining the cryogenic temperature subsequent to the initial cooling; a high pressure line which is connected to the expander and through which a working gas taken into the expander flows; a low pressure line which is connected to the expander and through which a working gas exhausted from the expander flows; a pressure sensor that measures a pressure of the high pressure line; a buffer volume for storing the working gas; a supply valve that connects the buffer volume to the low pressure line; and a controller that controls the supply valve during the initial cooling based on the pressure of the high pressure line measured by the pressure sensor to keep the pressure of the high pressure line within a preset pressure range.

8 Claims, 7 Drawing Sheets

(56) References Cited

U.S. PATENT DOCUMENTS

| | | | |
|---|---|---|---|
| 8,448,461 B2* | 5/2013 | Longsworth | F25B 9/14 62/401 |
| 9,366,459 B2* | 6/2016 | Morie | F25B 9/14 |
| 9,480,934 B2 | 11/2016 | Matsui | |
| 10,184,693 B2* | 1/2019 | Xu | F25B 9/14 |
| 10,288,052 B2 | 5/2019 | Dresens et al. | |
| 2010/0275616 A1 | 11/2010 | Saji et al. | |
| 2013/0219923 A1* | 8/2013 | Mizuno | F25B 9/14 62/6 |
| 2014/0260339 A1* | 9/2014 | Matsui | F04B 37/085 62/55.5 |
| 2014/0338367 A1* | 11/2014 | Morie | F25B 9/14 62/6 |
| 2021/0341199 A1 | 11/2021 | Oyama | |

FOREIGN PATENT DOCUMENTS

| | | |
|---|---|---|
| JP | H07-117310 B2 | 12/1995 |
| JP | H08-313086 A | 11/1996 |
| JP | H11-257768 A | 9/1999 |
| JP | H11-281182 A | 10/1999 |
| JP | 2003113779 A | 4/2003 |
| JP | 2009121786 A | 6/2009 |
| JP | 2013185480 A | 9/2013 |
| JP | 2020112315 A | 7/2020 |

\* cited by examiner

CRYOCOOLER AND METHOD FOR OPERATING CRYOCOOLER

CROSS-REFERENCE TO RELATED APPLICATIONS

This is a bypass continuation of International PCT Application No. PCT/JP2022/018561, filed on Apr. 22, 2022, which claims priority to Japanese Patent Application No. 2021-077105, filed on Apr. 30, 2021, which are incorporated by reference herein in their entirety.

BACKGROUND

Technical Field

A certain embodiment of the present invention relates to a cryocooler and a method for operating a cryocooler.

Description of Related Art

A cryocooler is used to cool various target objects such as superconducting equipment, measuring equipment, and samples used in a cryogenic environment. In order to cool a target object with the cryocooler, first, the cryocooler must be activated to cool the cryocooler from an initial temperature such as room temperature to a target cryogenic temperature. The initial cooling of such a cryocooler is also referred to as a cooldown.

SUMMARY

According to an embodiment of the present invention, there is provided a cryocooler including: an expander capable of executing initial cooling for cooling from an initial temperature to a cryogenic temperature and a steady operation of maintaining the cryogenic temperature subsequent to the initial cooling; a high pressure line which is connected to the expander and through which a working gas taken into the expander flows; a low pressure line which is connected to the expander and through which a working gas exhausted from the expander flows; a pressure sensor that measures a pressure of the high pressure line; a buffer volume that stores the working gas; a supply valve that connects the buffer volume to the low pressure line; and a controller configured to control the supply valve during the initial cooling based on the pressure of the high pressure line measured by the pressure sensor to keep the pressure of the high pressure line within a preset pressure range.

According to another embodiment of the present invention, there is provided a method for operating a cryocooler. A cryocooler includes: an expander; a high pressure line which is connected to the expander and through which a working gas taken into the expander flows; a low pressure line which is connected to the expander and through which a working gas exhausted from the expander flows; a pressure sensor that measures a pressure of the high pressure line; a buffer volume; and a supply valve that connects the buffer volume to the low pressure line. The method includes executing initial cooling to cool the expander from an initial temperature to a cryogenic temperature; and executing a steady operation for maintaining the expander at the cryogenic temperature subsequent to the initial cooling. The supply valve is controlled during the initial cooling based on the pressure of the high pressure line measured by the pressure sensor to keep the pressure of the high pressure line within a preset pressure range.

DETAILED DESCRIPTION

In order to cool a target object with the cryocooler, first, the cryocooler must be activated to cool the cryocooler from an initial temperature such as room temperature to a target cryogenic temperature. The initial cooling of such a cryocooler is also referred to as a cooldown. Since the initial cooling is merely a preparation for starting the cooling of the target object, it is desired that the required time is as short as possible.

It is desirable to shorten the initial cooling time of the cryocooler.

Any combination of the components described above and any replacement of the components and expressions of the present invention between methods, devices, systems, and the like are also effective as aspects of the present invention. Hereinafter, embodiments for carrying out the present invention will be described in detail with reference to the drawings. In the description and drawings, the same or equivalent components, members, and processes will be assigned with the same reference symbols, and redundant description thereof will be omitted as appropriate. The scales and shapes of each shown part are set for convenience in order to make the description easy to understand, and are not to be understood as limiting unless stated otherwise. The embodiments are merely examples and do not limit the scope of the present invention. All characteristics and combinations to be described in the embodiment are not necessarily essential to the invention.

Figure 1:
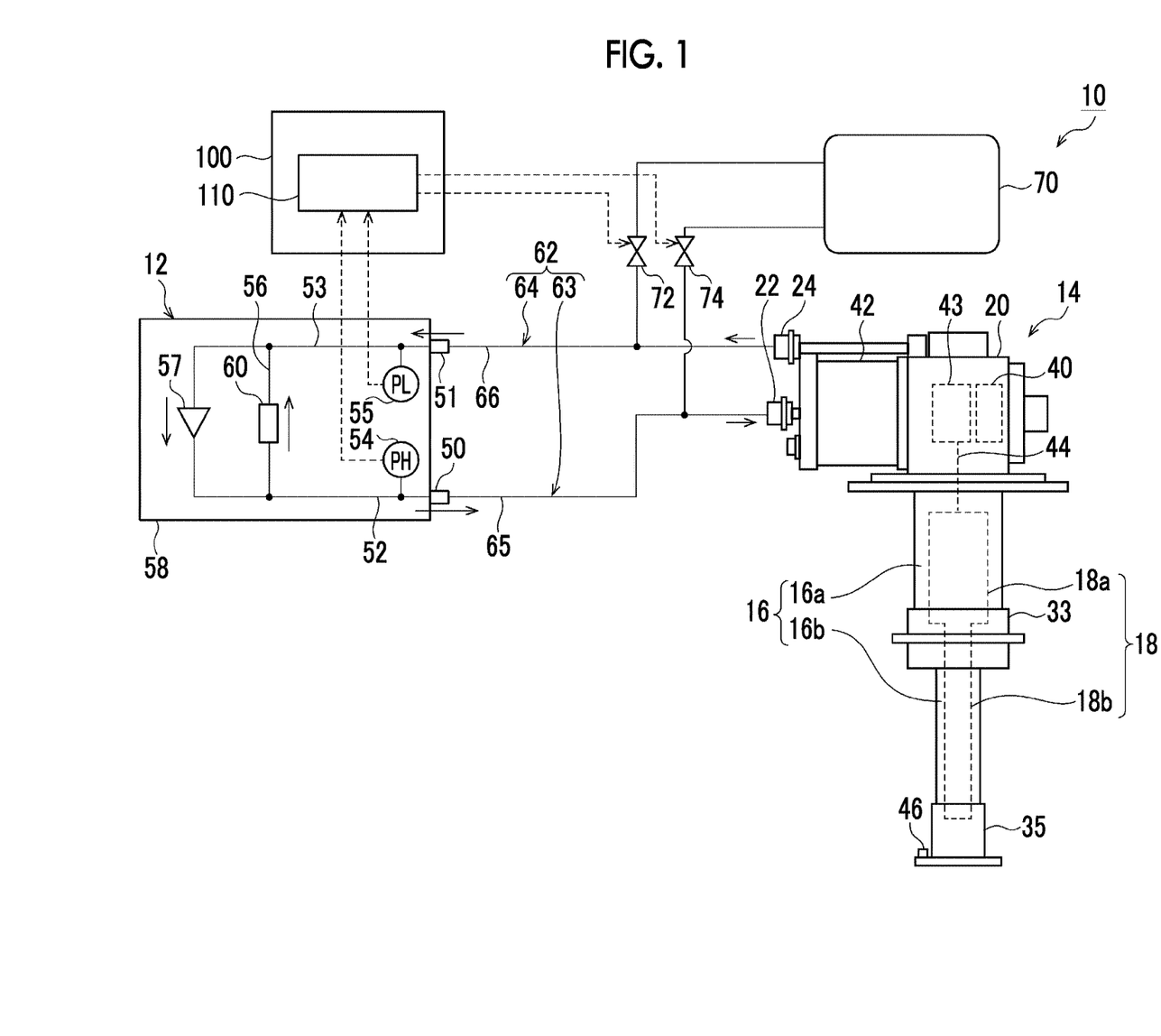
FIG. 1 is a diagram schematically showing a cryocooler according to an embodiment.
Figure 2:
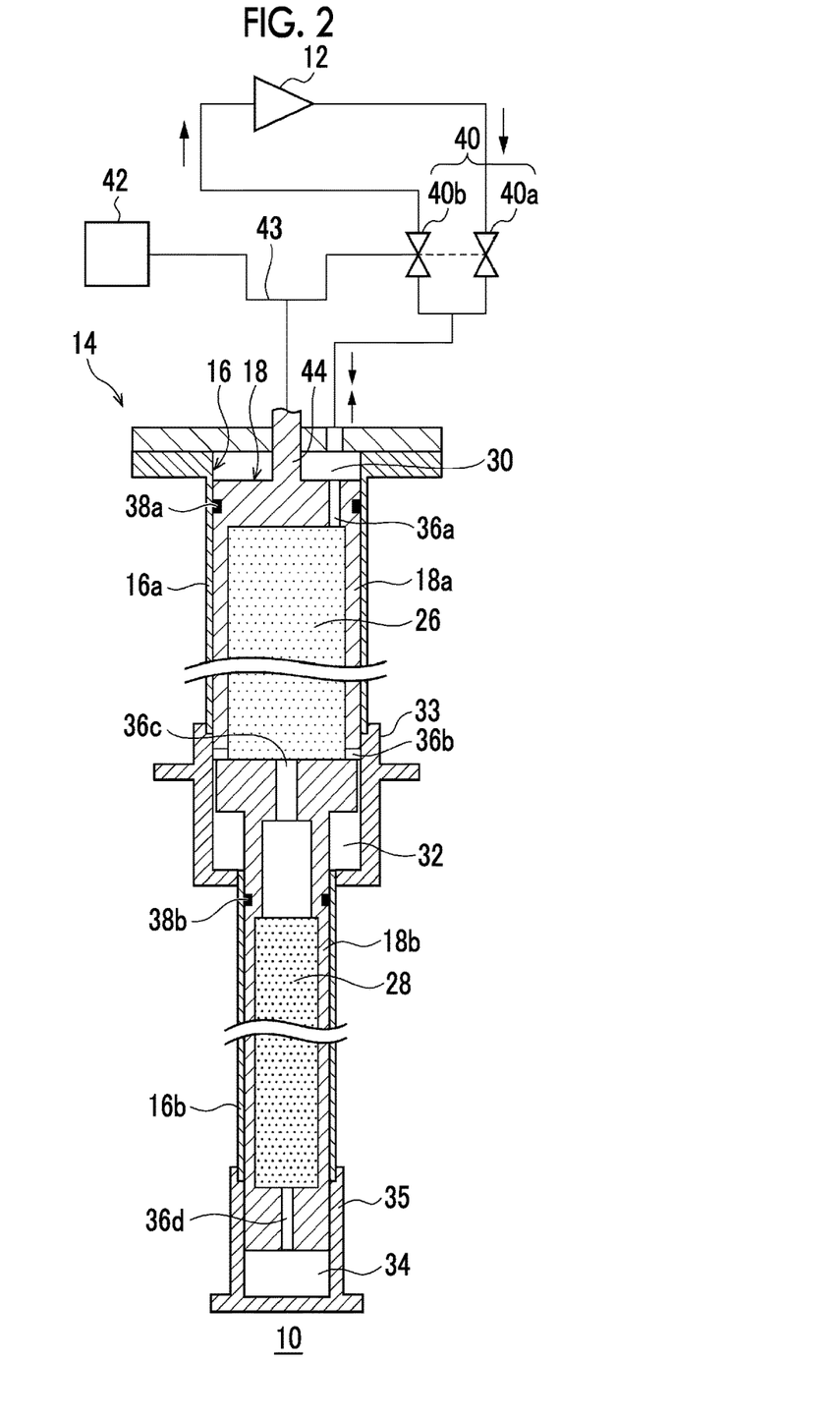
FIG. 2 is a diagram schematically showing the cryocooler according to the embodiment.

FIGS. 1 and 2 are views schematically showing a cryocooler 10 according to an embodiment. As an example, the cryocooler 10 is a two-stage Gifford-McMahon (GM) cryocooler. FIG. 1 schematically shows a compressor 12 and an expander 14 constituting the cryocooler 10 together with a control device 100, and FIG. 2 shows the internal structure of the expander 14 of the cryocooler 10.

The compressor 12 is configured to collect the working gas of the cryocooler 10 from the expander 14, pressurize the collected working gas, and supply the working gas to the expander 14 again. The compressor 12 and the expander 14 constitute a refrigeration cycle of the cryocooler 10, whereby the cryocooler 10 can provide desired cryogenic cooling. The expander 14 is also referred to as a cold head. The working gas is also referred to as a refrigerant gas and is usually a helium gas, but other suitable gas may be used. For the sake of understanding, the flow direction of the working gas is shown by an arrow in FIG. 1.

In general, the pressure of the working gas supplied from the compressor 12 to the expander 14 and the pressure of the working gas collected from the expander 14 to the compressor 12 are both considerably higher than the atmospheric pressure, and are referred to as the first high pressure and the second high pressure, respectively. For convenience of description, the first high pressure and the second high pressure are also simply referred to as high pressure and low pressure, respectively. Typically, the high pressure is, for example, 2 to 3 MPa. The low pressure is, for example, 0.5 to 1.5 MPa, for example, approximately 0.8 MPa. For the sake of understanding, the flow direction of the working gas is indicated by an arrow.

The expander 14 includes a cryocooler cylinder 16 and a displacer assembly 18. The cryocooler cylinder 16 guides the linear reciprocating motion of the displacer assembly 18, and forms expansion chambers (32, 34) for the working gas with the displacer assembly 18. In addition, the expander 14 includes a pressure switching valve 40 that determines an intake start timing of the working gas into the expansion chamber and an exhaust start timing of the working gas from the expansion chamber.

In this specification, in order to describe the positional relationship between the components of the cryocooler 10, for convenience, the side close to the top dead center of the axial reciprocation of the displacer is "upper", and the side close to the bottom dead center is "lower". The top dead center is the position of the displacer where the volume of the expansion space is maximum, and the bottom dead center is the position of the displacer where the volume of the expansion space is the minimum. Since a temperature gradient is generated in which the temperature drops from the upper side to the lower side in the axial direction during the operation of the cryocooler 10, the upper side can be referred to as a high temperature side and the lower side can be referred to as a low temperature side.

The cryocooler cylinder 16 has a first cylinder 16a and a second cylinder 16b. As an example, the first cylinder 16a and the second cylinder 16b are members having a cylindrical shape, and the second cylinder 16b has a diameter smaller than that of the first cylinder 16a. The first cylinder 16a and the second cylinder 16b are coaxially disposed, and a lower end of the first cylinder 16a is rigidly connected to an upper end of the second cylinder 16b.

The displacer assembly 18 includes a first displacer 18a and a second displacer 18b connected to each other, and these move integrally. As an example, the first displacer 18a and the second displacer 18b are members having a cylindrical shape, and the second displacer 18b has a diameter smaller than that of the first displacer 18a. The first displacer 18a and the second displacer 18b are disposed coaxially with each other.

The first displacer 18a is accommodated in the first cylinder 16a, and the second displacer 18b is accommodated in the second cylinder 16b. The first displacer 18a can reciprocate in the axial direction along the first cylinder 16a, and the second displacer 18b can reciprocate in the axial direction along the second cylinder 16b.

As shown in FIG. 2, the first displacer 18a accommodates a first regenerator 26. The first regenerator 26 is formed by filling a tubular main body portion of the first displacer 18a with a wire mesh such as copper or other appropriate first regenerator material. The upper lid portion and the lower lid portion of the first displacer 18a may be provided as members separate from the main body portion of the first displacer 18a, the upper lid portion and the lower lid portion of the first displacer 18a may be fixed to the main body by appropriate means such as fastening or welding, and accordingly, the first regenerator material may be accommodated in the first displacer 18a.

Similarly, the second displacer 18b accommodates a second regenerator 28. The second regenerator 28 is formed by filling a tubular main body portion of the second displacer 18b with a non-magnetic regenerator material such as bismuth, a magnetic regenerator material such as $HoCu_2$, or other appropriate second regenerator material. The second regenerator material may be formed in a granular shape. The upper lid portion and the lower lid portion of the second displacer 18b may be provided as members separate from the main body portion of the second displacer 18b, the upper lid portion and the lower lid portion of the second displacer 18b may be fixed to the main body by appropriate means such as fastening or welding, and accordingly, the second regenerator material may be accommodated in the second displacer 18b.

The displacer assembly 18 forms a room temperature chamber 30, a first expansion chamber 32, and a second expansion chamber 34 inside the cryocooler cylinder 16. The expander 14 includes a first cooling stage 33 and a second cooling stage 35 for heat exchange with a desired object or medium to be cooled by the cryocooler 10. The room temperature chamber 30 is formed between the upper lid portion of the first displacer 18a and the upper portion of the first cylinder 16a. The first expansion chamber 32 is formed between the lower lid portion of the first displacer 18a and the first cooling stage 33. The second expansion chamber 34 is formed between the lower lid portion of the second displacer 18b and the second cooling stage 35. The first cooling stage 33 is fixed to the lower portion of the first cylinder 16a to surround the first expansion chamber 32, and the second cooling stage 35 is fixed to the lower portion of the second cylinder 16b to surround the second expansion chamber 34.

The first regenerator 26 is connected to the room temperature chamber 30 through a working gas flow path 36a formed in the upper lid portion of the first displacer 18a, and is connected to the first expansion chamber 32 through a working gas flow path 36b formed in the lower lid portion of the first displacer 18a. The second regenerator 28 is connected to the first regenerator 26 through a working gas flow path 36c formed from the lower lid portion of the first displacer 18a to the upper lid portion of the second displacer 18b. In addition, the second regenerator 28 is connected to the second expansion chamber 34 through a working gas flow path 36d formed in the lower lid portion of the second displacer 18b.

The working gas flow between the first expansion chamber 32, the second expansion chamber 34, and the room temperature chamber 30 is not the clearance between the cryocooler cylinder 16 and the displacer assembly 18, but a first seal 38a and a second seal 38b may be provided to be guided to the first regenerator 26 and the second regenerator 28. The first seal 38a may be mounted to the upper lid portion of the first displacer 18a to be disposed between the first displacer 18a and the first cylinder 16a. The second seal 38b may be mounted to the upper lid portion of the second displacer 18b to be disposed between the second displacer 18b and the second cylinder 16b.

As shown in FIG. 1, the expander 14 includes a cryocooler housing 20 that accommodates the pressure switching valve 40. The cryocooler housing 20 is coupled to the cryocooler cylinder 16, thereby forming a hermetic container that accommodates the pressure switching valve and the displacer assembly 18.

As shown in FIG. 2, the pressure switching valve 40 includes a high pressure valve 40a and a low pressure valve 40b, and is configured to generate periodic pressure fluctuations in the cryocooler cylinder 16. The working gas discharge port of the compressor 12 is connected to the room temperature chamber 30 via the high pressure valve 40a, and the working gas suction port of the compressor 12 is connected to the room temperature chamber 30 via the low pressure valve 40b. The high pressure valve 40a and the low pressure valve 40b are configured to be selectively and alternately opened and closed (that is, when one is open, the other is closed).

The pressure switching valve 40 may take the form of a rotary valve. That is, the pressure switching valve 40 may be configured such that the high pressure valve 40a and the low pressure valve 40b are alternately opened and closed by the rotational sliding of the valve disc with respect to the stationary valve body. In that case, an expander motor 42 may be connected to the pressure switching valve 40 to rotate the valve disc of the pressure switching valve 40. For example, the pressure switching valve 40 is disposed such that the valve rotation axis is coaxial with the rotation axis of the expander motor 42.

Alternatively, the high pressure valve 40a and the low pressure valve 40b may be valves that can be individually controlled. In this case, the pressure switching valve 40 may not be connected to the expander motor 42.

The expander motor 42 is connected to a displacer drive shaft 44 via a motion conversion mechanism 43 such as a Scotch yoke mechanism. The expander motor 42 is attached to the cryocooler housing 20. The motion conversion mechanism 43 is accommodated in the cryocooler housing 20 similar to the pressure switching valve 40. The motion conversion mechanism 43 converts the rotary motion output by the expander motor 42 into a linear reciprocating motion of the displacer drive shaft 44. The displacer drive shaft 44 extends from the motion conversion mechanism 43 into the room temperature chamber 30, and is fixed to the upper lid portion of the first displacer 18a. The rotation of the expander motor 42 is converted into an axial reciprocation of the displacer drive shaft 44 by the motion conversion mechanism 43, and the displacer assembly 18 reciprocates linearly in the cryocooler cylinder 16 in the axial direction.

In addition, the expander 14 may include a temperature sensor 46 that measures the temperature of the second cooling stage 35 (and/or the first cooling stage 33) and outputs a measured temperature signal indicating the measured temperature.

The compressor 12 includes a high pressure gas outlet 50, a low pressure gas inlet 51, a high pressure flow path 52, a low pressure flow path 53, a first pressure sensor 54, a second pressure sensor 55, a bypass line 56, a compressor main body 57, and a compressor housing 58. The high pressure gas outlet 50 is installed in the compressor housing 58 as a working gas discharge port of the compressor 12, and the low pressure gas inlet 51 is installed in the compressor housing 58 as a working gas suction port of the compressor 12. The high pressure flow path 52 connects the discharge port of the compressor main body 57 to the high pressure gas outlet 50, and the low pressure flow path 53 connects the low pressure gas inlet 51 to the suction port of the compressor main body 57. The compressor housing 58 accommodates the high pressure flow path 52, the low pressure flow path 53, the first pressure sensor 54, the second pressure sensor 55, the bypass line 56, and the compressor main body 57. The compressor 12 is also referred to as a compressor unit.

The compressor main body 57 is configured to internally compress the working gas sucked from the suction port and discharge the working gas from the discharge port. For example, the compressor main body 57 may be a scroll type, a rotary type, or another pump for pressurizing the working gas. In this embodiment, the compressor main body 57 is configured to discharge a fixed and constant working gas flow rate. Alternatively, the compressor main body 57 may be configured to have a variable flow rate of the working gas to be discharged. The compressor main body 57 may be referred to as a compression capsule.

The first pressure sensor 54 is disposed in the high pressure flow path 52 to measure the pressure of the working gas flowing through the high pressure flow path 52. The first pressure sensor 54 is configured to output a first measured pressure signal PH indicating the measured pressure. The second pressure sensor 55 is disposed in the low pressure flow path 53 to measure the pressure of the working gas flowing through the low pressure flow path 53. The second pressure sensor 55 is configured to output a second measured pressure signal PL indicating the measured pressure. Therefore, the first pressure sensor 54 and the second pressure sensor 55 can also be referred to as a high pressure sensor and a low pressure sensor, respectively. Further, in this specification, any one of the first pressure sensor 54 and the second pressure sensor 55, or both of them may be collectively referred to as a "pressure sensor".

The bypass line 56 connects the high pressure flow path 52 to the low pressure flow path 53 to bypass the expander 14 and return the working gas from the high pressure flow path 52 to the low pressure flow path 53. The bypass line 56 is provided with a relief valve 60 for opening and closing the bypass line 56 or controlling the flow rate of the working gas flowing through the bypass line 56. The relief valve 60 is configured to open when a differential pressure equal to or higher than a set pressure acts between the inlet and outlet of the relief valve 60. The relief valve 60 may be an on/off valve or a flow control valve, and may be an electromagnetic valve, for example. The set pressure can be appropriately set based on the empirical knowledge of the designer, an experiment or simulation by the designer, or the like. In this manner, it is possible to prevent the differential pressure between the high pressure line 63 and the low pressure line 64 from exceeding the set pressure and becoming excessive. In addition, it is possible to prevent the pressure of the high pressure line 63 from becoming excessive.

The relief valve 60 may be configured to work as a so-called safety valve, that is, may be mechanically opened when a differential pressure equal to or higher than a set pressure acts between the inlet and outlet. Alternatively, the relief valve 60 may be opened and closed under the control of the control device 100. The control device 100 compares the differential pressure between the high pressure line 63 and the low pressure line 64 to be measured with the set pressure, and the relief valve 60 may be controlled to open the relief valve 60 when the measured differential pressure is equal to or higher than the set pressure, and to close the relief valve 60 when the measured differential pressure is less than the set pressure. The control device 100 may acquire the measured differential pressures of the high pressure line 63 and the low pressure line 64 based on the first measured pressure signal PH from the first pressure sensor 54 and the second measured pressure signal PL from the second pressure sensor 55. As another example, the control device 100 compares the measured pressure of the high pressure line 63 with the upper limit pressure based on the first measured pressure signal PH, and the relief valve 60 may be controlled to open the relief valve 60 when the measured pressure is equal to or higher than the upper limit pressure, and to close the relief valve 60 when the measured pressure is less than the upper limit pressure.

The compressor 12 may have various other components. For example, the high pressure flow path 52 may be provided with an oil separator, an adsorber, or the like. The low pressure flow path 53 may be provided with a storage tank or other components. Further, the compressor 12 may be provided with an oil circulation system that cools the compressor main body 57 with oil, a cooling system that cools the oil, or the like.

In addition, the cryocooler 10 includes a gas line 62 that circulates a working gas between the compressor 12 and the expander 14. The gas line 62 includes the high pressure line 63 connecting the compressor 12 to the expander 14 to supply the working gas from the compressor 12 to the expander 14, and the low pressure line 64 connecting the compressor 12 to the expander 14 to collect the working gas from the expander 14 to the compressor 12. The cryocooler housing 20 of the expander 14 is provided with a high pressure gas inlet 22 and a low pressure gas outlet 24. The high pressure gas inlet 22 is connected to the high pressure gas outlet 50 by a high-pressure pipe 65, and the low pressure gas outlet 24 is connected to the low pressure gas inlet 51 by a low-pressure pipe 66. The high pressure line 63 includes the high-pressure pipe 65 and the high pressure flow path 52, and the low pressure line 64 includes the low-pressure pipe 66 and the low pressure flow path 53. The bypass line 56 may be considered to be a part of the gas line 62. The bypass line 56 connects the high pressure line 63 to the low pressure line 64 to bypass the expander 14 and return the working gas from the high pressure line 63 to the low pressure line 64.

Therefore, the working gas collected from the expander 14 to the compressor 12 enters the low pressure gas inlet 51 of the compressor 12 from the low pressure gas outlet 24 of the expander 14 through the low-pressure pipe 66, and further returns to the compressor main body 57 through the low pressure flow path 53, is compressed by the compressor main body 57, and is pressurized. The working gas supplied from the compressor 12 to the expander 14 exits from the high pressure gas outlet 50 of the compressor 12 through the high pressure flow path 52 from the compressor main body 57, and further supplied to the expander 14 via the high-pressure pipe 65 and the high pressure gas inlet 22 of the expander 14.

Furthermore, the cryocooler 10 includes a buffer volume 70, a supply valve 72, and a collection valve 74. The buffer volume 70 is a volume for storing the working gas, and may be, for example, a buffer tank. The supply valve 72 connects the buffer volume 70 to the low pressure line 64, and the collection valve 74 connects the buffer volume 70 to the high pressure line 63. The supply valve 72 and the collection valve 74 may be an on/off valve or a flow control valve, and may be an electromagnetic valve, for example.

The pressure of the buffer volume 70 is a filling pressure of the working gas in the cryocooler 10 when the operation of the cryocooler 10 is stopped. When the cryocooler 10 is operating (for example, during initial cooling or steady operation), the pressure of the buffer volume 70 is a pressure intermediate between the pressure of the high pressure line 63 and the pressure of the low pressure line 64 (for example, average pressure of high pressure and low pressure).

Therefore, when the supply valve 72 is opened during the operation of the cryocooler 10, the working gas is supplied from the buffer volume 70 to the low pressure line 64 through the supply valve 72. When the supply valve 72 is closed, the supply of the working gas from the buffer volume 70 to the low pressure line 64 is stopped. Further, when the collection valve 74 is opened, the working gas is collected from the high pressure line 63 to the buffer volume 70 through the collection valve 74. When the collection valve 74 is closed, collection of the working gas from the high pressure line 63 to the buffer volume 70 is stopped. By opening and closing the supply valve 72 and the collection valve 74 in this manner, the amount of the working gas circulating in the gas line 62 can be adjusted, and as a result, the pressures of the high pressure line 63 and the low pressure line 64 can also be controlled.

As shown in FIG. 1, the control device 100 that controls the cryocooler 10 includes a controller 110 that controls the supply valve 72 and the collection valve 74. The controller 110 is electrically connected to the first pressure sensor 54 and the second pressure sensor 55 to acquire the first measured pressure signal PH and the second measured pressure signal PL. As will be described later, the controller 110 receives the first measured pressure signal PH from the first pressure sensor 54, and opens and closes the supply valve 72 and the collection valve 74 based on the measured pressure of the high pressure line 63 indicated by the first measured pressure signal PH. Further, the controller 110 is electrically connected to the temperature sensor 46 to acquire the measured temperature signal from the temperature sensor 46.

In the shown example, the control device 100 is provided separately from the compressor 12 and the expander 14, and is connected to these, but the present invention is not limited thereto. The control device 100 may be mounted on the compressor 12. The control device 100 may be provided in the expander 14, such as being mounted on the expander motor 42. The controller 110 may be provided in the supply valve 72, in the collection valve 74, or in each of the supply valve 72 and the collection valve 74.

The control device 100 is realized as a hardware configuration by elements or circuits such as a CPU or memory of a computer, and is realized by a computer program or the like as a software configuration. In FIG. 1, these are drawn as functional blocks realized by their cooperation as appropriate. It is understood by those skilled in the art that the functional blocks can be realized in various forms by combining hardware and software.

When the compressor 12 and the expander motor 42 are operated, the cryocooler 10 generates periodic volume fluctuations and pressure fluctuations of the working gas synchronized with the periodic volume fluctuations in the first expansion chamber 32 and the second expansion chamber 34. Typically, in the intake process, the low pressure valve 40b is closed and the high pressure valve 40a is opened, whereby the high pressure working gas flows from the compressor 12 into the room temperature chamber 30 through the high pressure valve 40a, is supplied to first expansion chamber 32 through the first regenerator 26, and is supplied to the second expansion chamber 34 through the second regenerator 28. In this manner, the first expansion chamber 32 and the second expansion chamber 34 are pressurized from the low pressure to the high pressure. At this time, the displacer assembly 18 is moved upward from the bottom dead center to the top dead center, and the volumes of the first expansion chamber 32 and the second expansion chamber 34 are increased. When the high pressure valve 40a is closed, the intake process ends.

In the exhaust process, the high pressure valve 40a is closed and the low pressure valve 40b is opened, whereby the high pressure first expansion chamber 32 and the second expansion chamber 34 are opened to the low pressure working gas suction port of the compressor 12, and thus the working gas expands in the first expansion chamber 32 and the second expansion chamber 34. As a result, the low pressure working gas is discharged from the first expansion chamber 32 and the second expansion chamber 34 to the room temperature chamber 30 through the first regenerator 26 and the second regenerator 28. At this time, the displacer assembly 18 is moved downward from the top dead center to the bottom dead center, and the volumes of the first expansion chamber 32 and the second expansion chamber 34 are reduced. The working gas is collected from the expander 14 to the compressor 12 through the low pressure valve 40b. When the low pressure valve 40b is closed, the exhaust process ends.

In this manner, for example, a refrigeration cycle such as a GM cycle is configured, and the first cooling stage 33 and the second cooling stage 35 are cooled to a desired cryogenic temperature. The first cooling stage 33 can be cooled to a first cooling temperature in the range of, for example, approximately 20 K to approximately 40 K. The second cooling stage 35 can be cooled to a second cooling temperature (for example, approximately 1 K to approximately 4 K) lower than the first cooling temperature.

The cryocooler 10 can execute initial cooling and steady operation subsequent to the initial cooling. The initial cooling is an operation mode of the expander 14 that rapidly cools from the initial temperature to the cryogenic temperature when the cryocooler 10 is activated, and the steady operation is an operation mode of the expander 14 that maintains a cryogenically cooled state by initial cooling. The initial temperature may be an ambient temperature (for example, room temperature). The expander 14 is cooled to a standard cooling temperature by initial cooling, and is maintained within an allowable temperature range of cryogenic temperature including the standard cooling temperature in steady operation. The standard cooling temperature varies depending on the application and setting of the cryocooler 10, but is typically approximately 4.2 K or lower in, for example, an application for cooling a superconducting device. In some other cooling applications, the standard cooling temperature may be, for example, approximately 10 K to 20 K, or 10 K or lower. As described above, the initial cooling can also be referred to as a cooldown.

Incidentally, during the initial cooling, the density of the working gas increases in the expander 14 as the temperature is lowered from the initial temperature to the cryogenic temperature. Along with this, the amount of the working gas accumulated in the expander 14 increases, that is, the working gas is absorbed by the expander 14 from the gas line 62. As a result, as the cooling of the expander 14 progresses, the pressure of the working gas circulating in the gas line 62 gradually decreases. Since a decrease in the pressure of the working gas causes a decrease in the cooling capacity of the cryocooler 10, there is a concern that this may become a factor that lengthens the time required for the initial cooling. Since the initial cooling is merely a preparation because the cooling of the target object is started by the cryocooler, it is desired that the required time is as short as possible.

In order to cope with such a problem, in this embodiment, the controller 110 controls the supply valve 72 to keep the pressure of the high pressure line 63 within a preset appropriate pressure range based on the pressure of the high pressure line 63 measured by the first pressure sensor 54 during the initial cooling. More specifically, the controller 110 may compare the measured pressure of the high pressure line 63 with the lower limit value Pc of the appropriate pressure range during the initial cooling, and operate the supply valve 72 to repeatedly open and close the supply valve 72 such that the pressure of the high pressure line 63 does not fall below the lower limit value Pc.

Further, in this embodiment, the controller 110 controls the collection valve 74 to keep the pressure of the high pressure line 63 within an appropriate pressure range based on the pressure of the high pressure line 63 measured by the first pressure sensor 54 during the initial cooling. More specifically, the controller 110 may compare the measured pressure of the high pressure line 63 with an upper limit value Pd of the appropriate pressure range during the initial cooling, and operate the collection valve 74 to repeatedly open and close the collection valve 74 such that the pressure of the high pressure line 63 does not exceed the upper limit value Pd.

Figure 3:
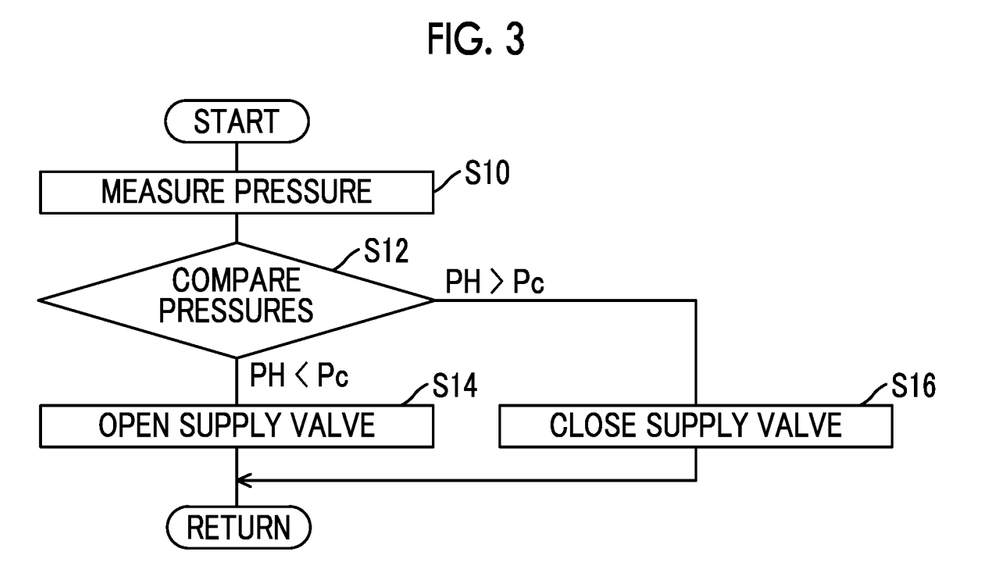
FIG. 3 is a flowchart for describing a method for controlling the cryocooler according to the embodiment.

FIG. 3 is a flowchart for describing a control method of the cryocooler 10 according to the embodiment. This method is repeatedly executed by the controller 110 in a predetermined cycle in the initial cooling of the cryocooler 10. This method may be continuously executed not only during the initial cooling but also during the steady operation of the cryocooler 10.

First, the pressure of the high pressure line 63 is measured (S10). The first pressure sensor 54 measures the pressure of the high pressure line 63, and outputs the first measured pressure signal PH indicating the measured pressure of the high pressure line 63. The controller 110 receives the first measured pressure signal PH and acquires the measured pressure of the high pressure line.

Next, the measured pressure of the high pressure line 63 is compared with an appropriate pressure range (S12). The lower limit value Pc of the appropriate pressure range is set such that the cryocooler 10 provides a sufficient cooling capacity. The upper limit value Pd of the appropriate pressure range is set not to generate excessive pressure in the high pressure line 63. The upper limit value Pd of the appropriate pressure range may be set to a pressure value smaller than the above-described set pressure at which the relief valve 60 is opened. The appropriate pressure range can be appropriately set based on the empirical knowledge of the designer, an experiment or simulation by the designer, or the like. The appropriate pressure range may be stored in advance in the controller 110 as an initial setting of the cryocooler 10, or may be set in the controller 110 by the user before the cryocooler 10 is operated.

As an example, the upper limit value Pd and the lower limit value Pc of the appropriate pressure range may be selected from, for example, a range of 2 MPa to 3 MPa or a range of 2.1 MPa to 2.7 MPa. The width of the appropriate pressure range, that is, the difference between the upper limit value Pd and the lower limit value Pc of the appropriate pressure range may be set to a certain value within 0.5 MPa, 0.3 MPa, or 0.1 MPa, for example. For example, the appropriate pressure range may be set to 2.45±0.05 MPa. In this case, the width of the appropriate pressure range is 0.1 MPa, the upper limit value Pd is 2.5 MPa, and the lower limit value Pc is 2.4 MPa.

The controller 110 compares the measured pressure of the high pressure line 63 with the lower limit value Pc of the appropriate pressure range, and opens the supply valve 72 when the measured pressure of the high pressure line 63 falls below the lower limit value Pc (PH<Pc) (S14). In this manner, the working gas is supplied from the buffer volume 70 to the low pressure line 64 through the supply valve 72. Since the amount of the working gas circulating in the gas line 62 increases, the pressure in the high pressure line 63 is restored.

The controller 110 closes the supply valve 72 when the measured pressure of the high pressure line 63 is restored to an appropriate pressure range (S16). For example, the controller 110 may compare the measured pressure of the high pressure line 63 with the lower limit value Pc of the appropriate pressure range, and close the supply valve 72 when the measured pressure of the high pressure line 63 exceeds the lower limit value Pc (PH>Pc or Ph≥Pc). When the supply valve 72 is closed, the supply of the working gas from the buffer volume 70 to the low pressure line 64 is stopped.

In this manner, the present method ends, and is executed again in the next control cycle.

The pressure threshold for closing the supply valve 72 may be different from the lower limit value Pc of the appropriate pressure range, and may be larger than the lower limit value Pc, for example. The pressure threshold may be set not to exceed the upper limit value Pd of the appropriate pressure range.

For example, the pressure threshold may be a value obtained by adding a predetermined ratio of a width of an appropriate pressure range (upper limit value Pd-lower limit value Pc) to the lower limit value Pc. For example, the predetermined ratio may be 50% or less, 30% or less, or 10% or less.

Figure 4:
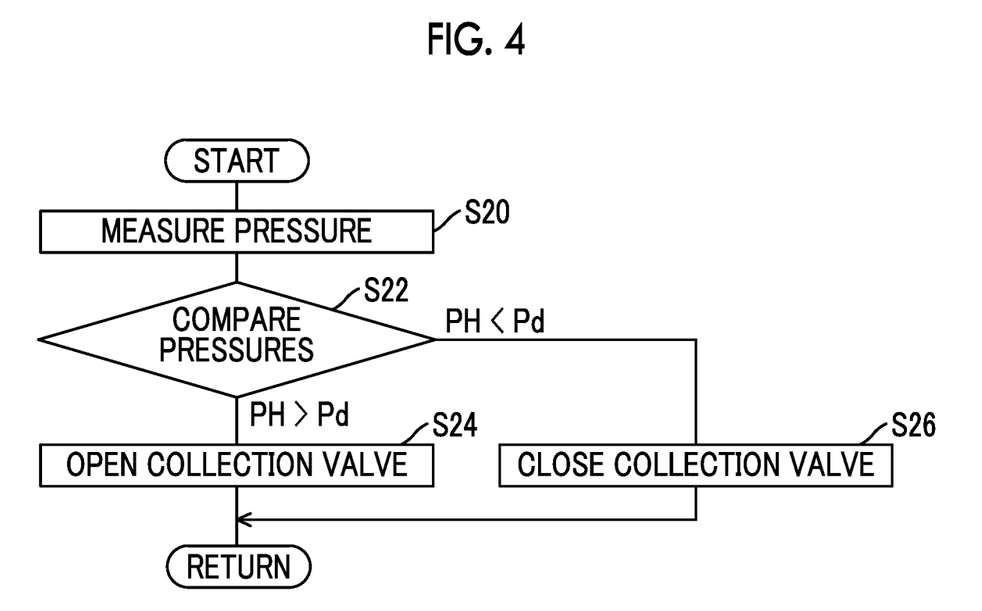
FIG. 4 is a flowchart for describing a method for controlling the cryocooler according to the embodiment.

FIG. 4 is a flowchart for describing a control method of the cryocooler 10 according to the embodiment. This method is repeatedly executed by the controller 110 in a predetermined cycle in the initial cooling of the cryocooler 10. This method may be executed in parallel with the method shown in FIG. 3. This method may be continuously executed not only during the initial cooling but also during the steady operation of the cryocooler 10.

First, the pressure of the high pressure line 63 is measured using the first pressure sensor 54 (S20). The controller 110 receives the first measured pressure signal PH from the first pressure sensor 54, and acquires the measured pressure of the high pressure line.

Next, the measured pressure of the high pressure line 63 is compared with an appropriate pressure range (S22). The controller 110 compares the measured pressure of the high pressure line 63 with the upper limit value Pd of the appropriate pressure range, and opens the collection valve 74 when the measured pressure of the high pressure line 63 exceeds the upper limit value Pd (PH>Pd) (S24). As a result, the working gas is collected from the high pressure line 63 to the buffer volume 70 through the collection valve 74, and the pressure of the high pressure line 63 decreases.

The controller 110 closes the collection valve 74 when the measured pressure of the high pressure line 63 is restored to an appropriate pressure range (S26). For example, the controller 110 may compare the measured pressure of the high pressure line 63 with the upper limit value Pd of the appropriate pressure range, and close the collection valve 74 when the measured pressure of the high pressure line 63 falls below the upper limit value Pd (PH<Pd or PH≤Pd). When the collection valve 74 is closed, collection of the working gas from the high pressure line 63 to the buffer volume 70 is stopped.

In this manner, the present method ends, and is executed again in the next control cycle.

The pressure threshold for closing the collection valve 74 may be different from the upper limit value Pd of the appropriate pressure range, and may be smaller than, for example, the upper limit value Pd. This pressure threshold may be selected from an appropriate pressure range, that is, may be larger than the lower limit value Pc of an appropriate pressure range.

The appropriate pressure range may be changed during the operation of the cryocooler 10. For example, the appropriate pressure range in the initial cooling may be different from the appropriate pressure range in the steady operation, and may be higher than the appropriate pressure range in the steady operation, for example. For example, the lower limit value Pc in the initial cooling may be higher than the lower limit value Pc in the steady operation, and/or the upper limit value Pd in the initial cooling may be higher than the upper limit value Pd in the steady operation.

In this case, the switching from the initial cooling to the steady operation and the change of the appropriate pressure range may be controlled by the control device 100. For example, the control device 100 may compare the measured temperature of the second cooling stage 35 (and/or the first cooling stage 33) with the above-described standard cooling temperature based on the measured temperature signal from the temperature sensor 46, execute the initial cooling when the measured temperature is higher than the standard cooling temperature, and shift from the initial cooling to the steady operation when the measured temperature is equal to or lower than the standard cooling temperature. The controller 110 may change the appropriate pressure range with the shift from the initial cooling to the steady operation.

Further, as will be described later with reference to FIGS. 7 and 8, the switching from the initial cooling to the steady operation and the change of the appropriate pressure range may be performed based on the pressure of the buffer volume 70 or based on the differential pressure of the high pressure line 63 and the low pressure line 64. In this manner, the control device 100 can complete the initial cooling of the cryocooler 10 without depending on the temperature sensor 46.

Here, in order to ensure the supply of the working gas from the buffer volume 70, a condition desired for the buffer volume 70 is considered. From the state equation of the ideal gas, while the operation of the cryocooler 10 is stopped (that is, before the initial cooling), $$PI(VH+VL+VB)=nRT \quad (1)$$

is established. Here, PI (MPa) indicates the working gas filling pressure of the cryocooler 10 at the temperature T (K), VH (L) indicates the volume of the high pressure line 63, VL (L) indicates the volume of the low pressure line 64, VB (L) indicates the volume of the buffer volume 70, n (mol) indicates the amount of the working gas in the cryocooler 10, and R indicates the gas constant.

Similarly, during the steady operation of the cryocooler 10, $$PHVH+PLVL+PBVB=nRT \quad (2)$$

is established. Here, PH (MPa) indicates the pressure of the high pressure line 63 in the steady operation at the temperature T, PL (MPa) indicates the pressure of the low pressure line 64 in the steady operation at the temperature T, and PB (MPa) indicates the pressure of the buffer volume 70 in the steady operation at the temperature T.

From Equations (1) and (2), $$PI(VH+VL+VB)=PHVH+PLVL+PBVB \quad (3)$$

is established.

In order to supply the working gas from the buffer volume 70 to the low pressure line 64 at any timing during the operation of the cryocooler 10, for any temperature T in a temperature range from the initial temperature of the cryocooler 10 to the cryogenic temperature, $$PL \leq PB \quad (4)$$

is supposed to be satisfied.

When Equation (3) is solved for PB and substituted into Equation (4), the following relationship is obtained.

$$VB \geq VH(PH-PI)/(PI-PL)-VL \quad (5)$$

Therefore, in order to ensure the supply of the working gas from the buffer volume 70 to the low pressure line 64, it is preferable that the buffer volume 70 satisfies Equation (5) for any temperature in the temperature range from the initial temperature to the cryogenic temperature.

Similarly, in order to ensure gas collection to the buffer volume 70, a condition desired for the buffer volume 70 is considered. In this case, in order to supply the working gas from the buffer volume 70 to the high pressure line 63 at any timing during the operation of the cryocooler 10, for any temperature T in a temperature range from the initial temperature of the cryocooler 10 to the cryogenic temperature, $$PB \leq PH \quad (6)$$

is supposed to be satisfied.

When Equation (3) is solved for PB and substituted into Equation (6), the following relationship is obtained.

$$VB \geq -VH+VL(PI-PL)/(PH-PI) \quad (7)$$

Therefore, in order to ensure the collection of the working gas from the high pressure line 63 to the buffer volume 70, it is preferable that the buffer volume 70 satisfies Equation (7) for any temperature in the temperature range from the initial temperature to the cryogenic temperature.

Figure 5:
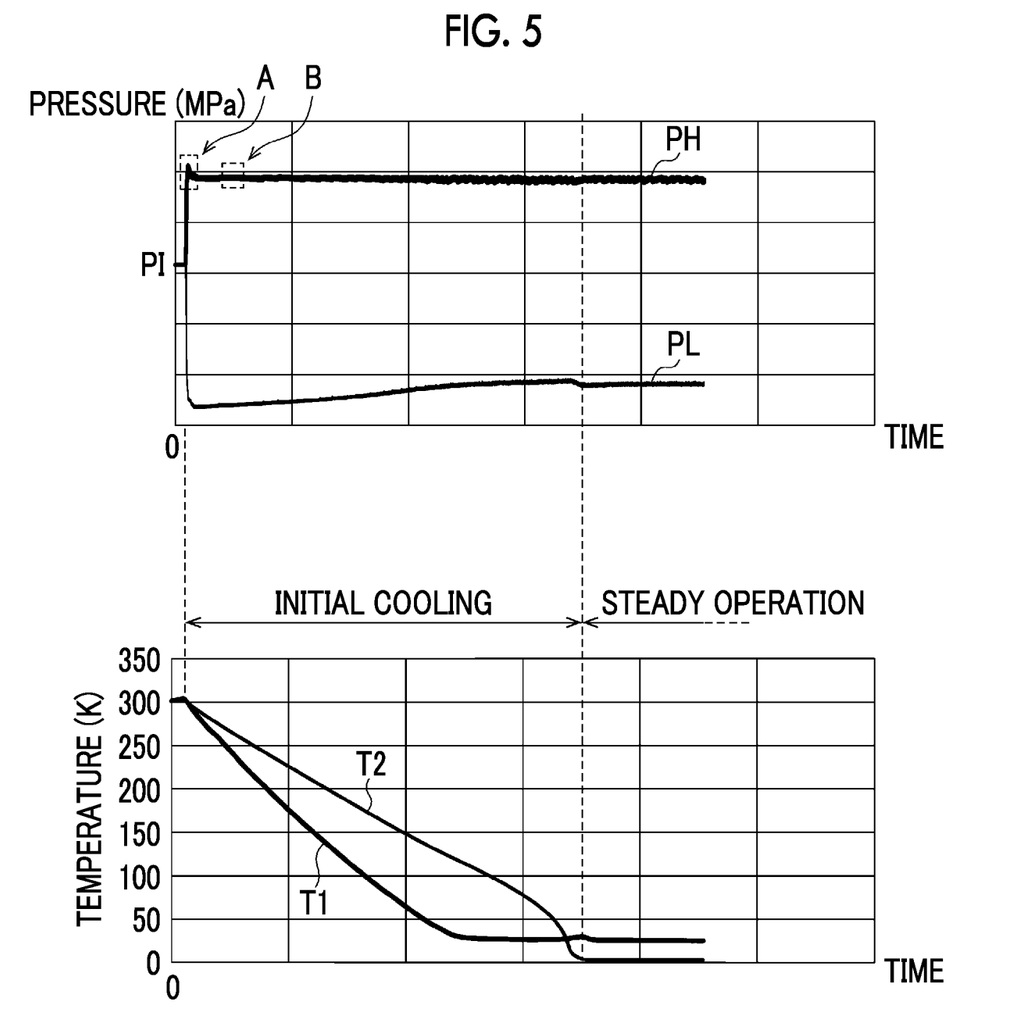
FIG. 5 is a graph showing an example of changes in temperature and pressure during an operation of the cryocooler according to the embodiment.

FIG. 5 is a graph showing an example of time-dependent changes in temperature and pressure during the operation of the cryocooler 10 according to the embodiment. The shown pressure change is acquired by an experiment, and in the upper part of FIG. 5, the pressure PH of the high pressure line 63 measured by the first pressure sensor 54 and the pressure PL of the low pressure line 64 measured by the second pressure sensor 55 are shown. A temperature T1 of the first cooling stage 33 and a temperature T2 of the second cooling stage are shown in the lower part of FIG. 5. The horizontal axis represents time.

Before the cryocooler 10 is activated (time 0), both the pressure PH of the high pressure line 63 and the pressure PL of the low pressure line 64 are the filling pressures PI, and the temperature T1 of the first cooling stage 33 and the temperature T2 of the second cooling stage 35 are room temperature (approximately 300 K). When the cryocooler 10 is activated and the initial cooling is started, the compressor 12 and the expander 14 work, the pressure PH of the high pressure line 63 is increased from the filling pressure PI, and the pressure PL of the low pressure line 64 decreases from the filling pressure PI. Due to the initial cooling, the temperature T1 of the first cooling stage 33 and the temperature T2 of the second cooling stage 35 decrease. When the first cooling stage 33 and the second cooling stage 35 are each cooled to the above-described standard cooling temperature (for example, T1≤30 K, T2≤4 K), the initial cooling is completed and shifted to the steady operation.

Figure 6A:
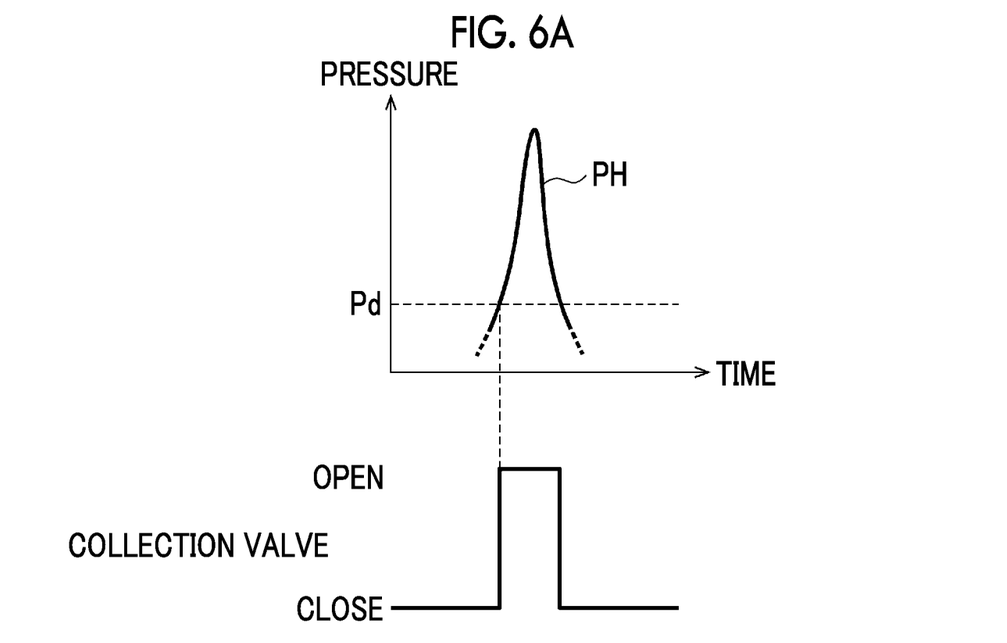
FIGS. 6A and 6B are graphs showing an example of a change in pressure during the operation of the cryocooler according to the embodiment.
Figure 6B:
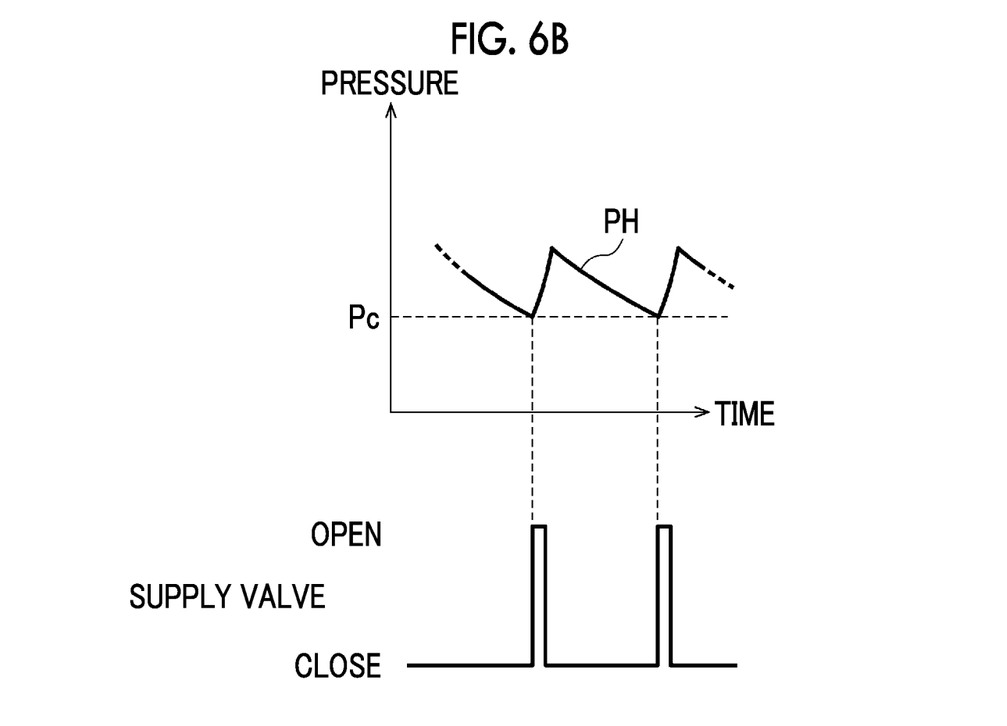

FIG. 6A schematically shows an enlarged portion A shown in FIG. 5, and FIG. 6B schematically shows an enlarged portion B shown in FIG. 5. FIG. 6A shows the pressure PH of the high pressure line 63 immediately after the start of the initial cooling together with the open/closed state of the collection valve 74, and FIG. 6B shows the pressure PH of the high pressure line 63 after the portion A together with the open/closed state of the supply valve 72.

As shown in FIG. 6A, when the pressure PH of the high pressure line 63 exceeds the upper limit value Pd of the appropriate pressure range, the collection valve 74 is opened. Since the working gas is collected from the high pressure line 63 to the buffer volume 70 through the collection valve 74, the pressure PH of the high pressure line 63 decreases. When the pressure PH of the high pressure line 63 falls below the upper limit pressure Pd, the collection valve 74 is closed. In this manner, excessive pressurization of the high pressure line 63 can be avoided. The risk of an emergency stop of the compressor 12 due to excessive pressurization is reduced. Further, since the buffer volume 70 is pressurized by collecting the working gas, which leads to effective utilization for supplying the working gas from the buffer volume 70 to the low pressure line 64.

As shown in FIG. 6B, when the pressure PH of the high pressure line 63 falls below the lower limit value Pc of the appropriate pressure range, the supply valve 72 is opened. The working gas is supplied from the buffer volume 70 to the low pressure line 64 through the supply valve 72. Since the amount of the working gas circulating in the gas line 62 increases, the pressure in the high pressure line 63 is restored. In this manner, when the pressure PH of the high pressure line 63 exceeds the lower limit value Pc, the supply valve 72 is closed.

As described above, the density of the working gas increases in the expander 14 due to the temperature decrease of the expander 14 during the initial cooling, which has the effect of lowering the pressure PH of the high pressure line 63. Therefore, even when the pressure PH of the high pressure line 63 is restored once, the pressure PH falls below the lower limit value Pc again. The supply valve 72 is opened again, the pressure in the high pressure line 63 is restored, and the supply valve 72 is closed. In this manner, the supply valve 72 operates to repeatedly open and close to maintain the pressure PH of the high pressure line 63 within an appropriate pressure range.

When the working gas is not supplied to the gas line 62 during the initial cooling, the pressure PH of the high pressure line 63 may significantly decrease due to the temperature decrease of the expander 14. Since the cooling capacity of the cryocooler 10 correlates with the pressure PH of the high pressure line 63, the cooling capacity of the cryocooler 10 may decrease as the initial cooling progresses. This can be a factor that increases the time required for the initial cooling.

On the other hand, according to the embodiment, the pressure PH of the high pressure line 63 can be maintained within an appropriate pressure range by controlling the supply valve 72 during the initial cooling. Therefore, the cooling capacity of the cryocooler 10 can be appropriately maintained, and an increase in the initial cooling time can be suppressed. Further, by keeping the pressure PH of the high pressure line 63 substantially constant, the cryocooler 10 can provide a stable cooling capacity.

In this embodiment, since the bypass line 56 and the relief valve 60 are provided, when the pressure PH of the high pressure line 63 increases, when the pressure PH in the high pressure line 63 increases, the working gas can be released from the high pressure line 63 to the low pressure line 64 through the bypass line 56 to suppress excessive pressurization. However, such a bypass stream reduces the flow rate of the working gas supplied from the compressor 12 to the expander 14, and thus can result in reduced cooling capacity of the cryocooler 10. However, this embodiment is advantageous because the pressure PH of the high pressure line 63 can be maintained within an appropriate pressure range by utilizing the buffer volume 70, and thus it is not necessary to rely on the bypass stream.

In order to maintain the pressure PH of the high pressure line 63 within an appropriate pressure range, a method for controlling the supply valve 72 and the collection valve 74 based on the pressure of the low pressure line 64 is also conceivable. The pressure of the low pressure line 64 is affected by the cooling temperature of the expander 14 (fluctuates depending on the cooling temperature). Therefore, it is practically essential to set an appropriate pressure range of the low pressure line 64, that is, a pressure threshold of the low pressure line 64 for opening and closing the supply valve 72 and the collection valve 74 to a different value depending on the cooling temperature, and the design of the control becomes complicated. Further, even when the low pressure line 64 is within an appropriate pressure range, there may be a case where the pressure of the high pressure line 63 is excessively high depending on the cooling temperature. Therefore, a method based on the pressure of the high pressure line 63 as in the embodiment is advantageous in that such inconvenience is alleviated or prevented.

Figure 7:
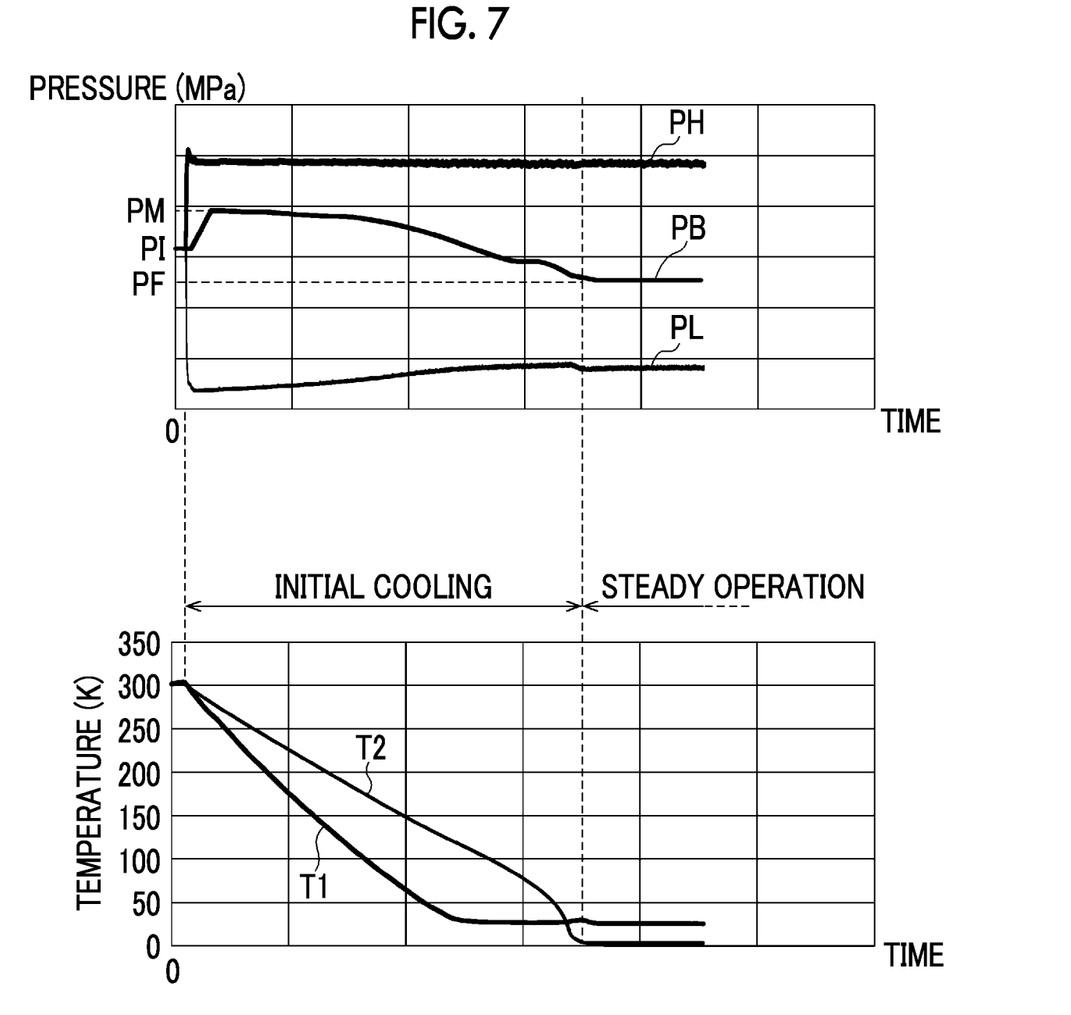
FIG. 7 is a graph showing an example of changes in temperature and pressure during an operation of the cryocooler according to the embodiment.
Figure 8:
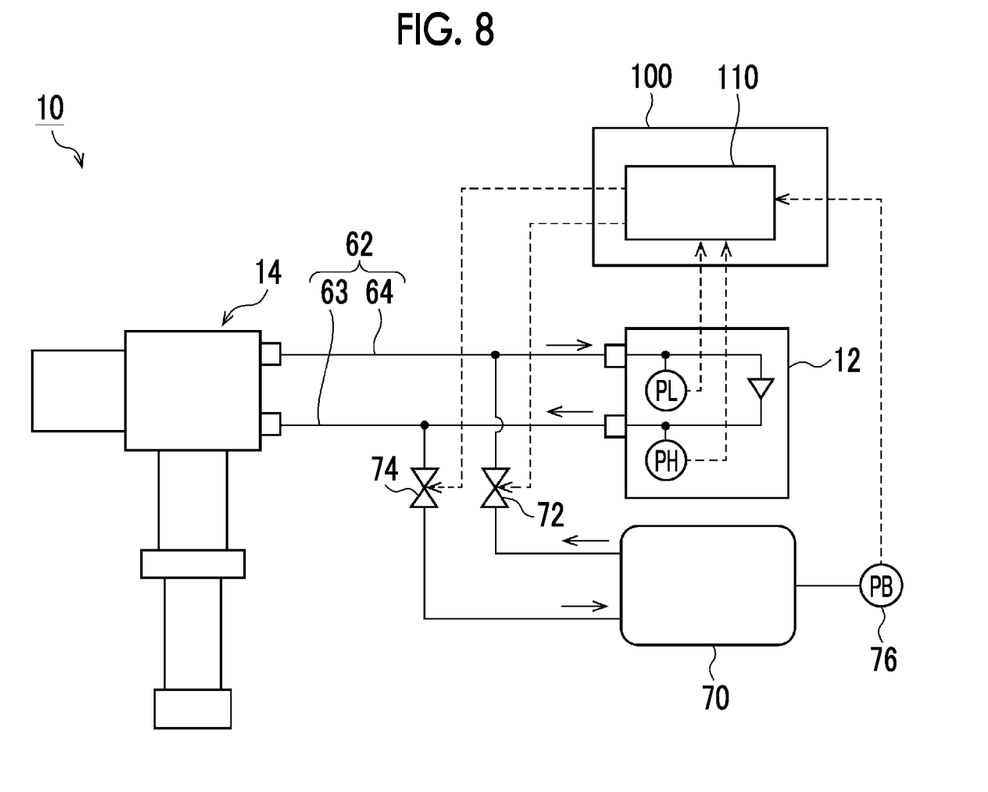
FIG. 8 is a diagram schematically showing the cryocooler according to the embodiment.

FIG. 7 is a graph showing an example of changes in temperature and pressure during an operation of the cryocooler 10 according to the embodiment. FIG. 8 is a diagram schematically showing the cryocooler 10 according to the embodiment.

Similar to the above-described embodiment, the cryocooler 10 includes the compressor 12, the expander 14, the buffer volume 70, and the control device 100. The controller 110 controls the supply valve 72 to keep the pressure of the high pressure line 63 within a preset appropriate pressure range based on the pressure of the high pressure line 63 measured by the first pressure sensor 54 during the initial cooling. Further, the controller 110 controls the collection valve 74 to keep the pressure of the high pressure line 63 within an appropriate pressure range based on the pressure of the high pressure line 63 measured by the first pressure sensor 54 during the initial cooling.

The cryocooler 10 includes a buffer pressure sensor 76 connected to the buffer volume 70 to measure the pressure of the buffer volume 70. The buffer pressure sensor 76 is configured to be electrically connected to the control device 100, and output a measured buffer pressure signal PB representing the measured pressure to the control device 100.

In the upper part of FIG. 7, in addition to the pressure PH of the high pressure line 63 and the pressure PL of the low pressure line 64 shown in FIG. 5, the pressure PB of the buffer volume 70 measured by the buffer pressure sensor 76 is shown. The temperature T1 of the first cooling stage 33 and the temperature T2 of the second cooling stage 35 are shown in the lower part of FIG. 7. As will be understood from FIG. 7, when the cryocooler 10 is sufficiently cooled by the completion of the initial cooling and the temperatures of the first cooling stage 33 and the second cooling stage 35 are stabilized, the pressure PH of the high pressure line 63 and the pressure PL of the low pressure line 64 are also stabilized. At this time, both the supply valve 72 and the collection valve 74 are closed, and the buffer volume 70 is disconnected from the gas line 62. Therefore, the pressure PB of the buffer volume 70 is also constant (final buffer pressure PF shown in FIG. 7).

Therefore, the completion of the initial cooling can be determined by detecting the stabilization of the pressure PB having the buffer volume 70. When the working gas filling pressure PI of the cryocooler 10 and operating conditions (for example, high pressure PH, low pressure PL, temperatures T1 and T2, and the like) are known, the final pressure of the buffer volume 70 when the initial cooling is completed can be predicted. In this case, the controller 110 may compare the predicted value of the final buffer pressure with the measured pressure PB of the buffer volume 70, and based on the comparison result, the controller 110 may determine whether or not the measured pressure PB of the buffer volume 70 is equal to the predicted value of the final buffer pressure. The controller 110 may complete the initial cooling when a state where the measured pressure PB of the buffer volume 70 is equal to the predicted value of the final buffer pressure continues for a predetermined time (for example, several minutes).

Alternatively, the controller 110 may calculate a difference between the measured pressure PB of the buffer volume 70 and a reference pressure during the initial cooling, and detect the stabilization of the calculated pressure difference, to determine the completion of the initial cooling. The reference pressure may be the pressure of the previously measured buffer volume 70, and may be, for example, a maximum value PM of the pressure of the buffer volume 70 measured during the initial cooling. It is understood, from FIG. 7, that the pressure of the buffer volume 70 increases from the filling pressure PI and takes the maximum value PM immediately after the start of the initial cooling.

The controller 110 may compare the calculated pressure difference (that is, the difference between the measured pressure PB of the buffer volume 70 and the reference pressure) with the pressure difference target value, and based on the comparison result, the controller 110 may determine whether or not the calculated pressure difference is equal to the pressure difference target value. The controller 110 may complete the initial cooling when a state where the calculated pressure difference is equal to the pressure difference target value continues for a predetermined time. For example, the predetermined time may be selected from a range of 1 minute or more and 10 minutes or less. When the difference between the calculated pressure difference and the pressure difference target value is within a predetermined value (for example, 0.05 MPa), it can be considered that the calculated pressure difference is equal to the pressure difference target value. Since this pressure difference target value does not depend on the filling pressure PI, it is possible to determine the completion of the initial cooling even when the filling pressure PI is unknown.

As another example of the reference pressure, the pressure PH of the high pressure line 63 (or the pressure PL of the low pressure line 64) measured at the same timing as the measured pressure PB of the buffer volume 70 may be used. The controller 110 may calculate a difference between the measured pressure PB of the buffer volume 70 and the measured pressure PH of the high pressure line 63 (or the measured pressure PL of the low pressure line 64), and detect the stabilization of the calculated pressure difference, to determine the completion of the initial cooling. Similar to the above example, the controller 110 may compare the calculated pressure difference with the pressure difference target value, and when the calculated pressure difference is equal to the pressure difference target value over a predetermined time, the controller 110 may complete the initial cooling.

As a further alternative example, the controller 110 may calculate the difference between the measured pressure PH of the high pressure line 63 and the measured pressure PL of the low pressure line 64, and detect the stabilization of the calculated pressure difference, to determine the completion of the initial cooling.

Above, the present invention was described based on examples. It will be understood by those skilled in the art that the present invention is not limited to the above-described embodiment, various design changes are possible, various modification examples are possible, and such modification examples are also within the scope of the present invention. Various characteristics described in relation to one embodiment are also applicable to other embodiments. A new embodiment generated through combination also has the effects of each of the combined embodiments.

In the above-described embodiment, as an example, a case where the expander motor 42 works at a constant operating frequency (motor rotation speed) (that is, a case where the expander motor 42 works at the same operating frequency in initial cooling and steady operation) is described, but the present invention is not limited thereto. The cryocooler 10 may include the expander motor 42 having a variable operating frequency, and during initial cooling, so-called accelerated cooling in which the expander motor 42 works at a higher operating frequency than in steady operation may be executed. In this case, the switching from the initial cooling (accelerated cooling) to the steady operation and the change of the operating frequency may be performed based on the pressure of the buffer volume 70 or based on the differential pressure of the high pressure line 63 and the low pressure line 64 as described above with reference to FIGS. 7 and 8. By executing the accelerated cooling, the initial cooling time can be further shortened.

The pressure sensors such as the first pressure sensor 54 and the second pressure sensor 55 are not essential to be provided in the compressor 12, and may be provided at any place where the pressure of the gas line 62 and the expander 14 can be measured. For example, the first pressure sensor 54 may be provided at any place on the high pressure line 63, and the second pressure sensor 55 may be provided at any place on the low pressure line 64.

In the above-described embodiment, the supply valve 72 and the collection valve 74 are prepared as separate valves, and each of the supply valve 72 and the collection valve 74 are connected to the buffer volume 70. However, the present invention is not limited thereto. For example, the supply valve 72 and the collection valve 74 may be integrated, or may be, for example, a three-way valve connected to the buffer volume 70. By switching the three-way valve, a supply state where the buffer volume 70 is connected to the low pressure line 64 and a collection state where the buffer volume 70 is connected to the high pressure line 63 may be switched.

In the embodiment described above, the buffer volume 70 is a single buffer tank. However, in a certain embodiment, the buffer volume 70 may be a plurality of buffer tanks. One buffer tank may be connected to the low pressure line 64 by the supply valve 72, and another buffer tank may be connected to the high pressure line 63 by the collection valve 74. Further, in the above-described embodiment, the buffer volume 70 is disposed outside the compressor 12 and the expander 14, but the present invention is not limited thereto.

For example, the buffer volume 70 may be disposed inside the compressor 12.

In the above-described embodiment, a case where the cryocooler 10 is a two-stage GM cryocooler was described as an example, but the present invention is not limited thereto. The cryocooler 10 may be a single-stage or multi-stage GM cryocooler, and may be another type of cryocooler such as a pulse tube cryocooler.

Above, the present invention was described based on examples. It will be understood by those skilled in the art that the present invention is not limited to the above-described embodiment, various design changes are possible, various modification examples are possible, and such modification examples are also within the scope of the present invention.

The present invention can be used in the field of a cryocooler and a method for operating a cryocooler.

It should be understood that the invention is not limited to the above-described embodiment, but may be modified into various forms on the basis of the spirit of the invention. Additionally, the modifications are included in the scope of the invention

What is claimed is:

1. A cryocooler comprising:
    an expander capable of executing initial cooling for cooling from an initial temperature to a cryogenic temperature and a steady operation of maintaining the cryogenic temperature subsequent to the initial cooling;
    a high pressure line which is connected to the expander and through which a working gas taken into the expander flows;
    a low pressure line which is connected to the expander and through which a working gas exhausted from the expander flows;
    a pressure sensor that measures a pressure of the high pressure line;
    a buffer volume that stores the working gas;
    a supply valve that connects the buffer volume to the low pressure line; and
    a controller configured to control the supply valve during the initial cooling based on the pressure of the high pressure line measured by the pressure sensor to keep the pressure of the high pressure line within a preset pressure range.

2. The cryocooler according to claim 1, wherein
    the controller is configured to:
        compare the measured pressure of the high pressure line with a lower limit value of the preset pressure range during the initial cooling, and
        operate the supply valve to repeatedly open and close the supply valve during the initial cooling such that the pressure of the high pressure line does not fall below the lower limit value.

3. The cryocooler according to claim 1, wherein
    the buffer volume is configured to satisfy VB≥VH(PH−PI)/(PI−PL)−VL for any temperature in a temperature range from the initial temperature to the cryogenic temperature where VB represents a volume of the buffer volume, VH represents a volume of the high pressure line, VL represents a volume of the low pressure line, PI represents a working gas filling pressure at a certain temperature, PH represents a pressure of the high pressure line in the steady operation at the certain temperature, and PL represents a pressure of the low pressure line in the steady operation at the certain temperature.

4. The cryocooler according to claim 1, further comprising:
  a collection valve connecting the buffer volume to the high pressure line, wherein
  the controller is configured to control the collection valve to keep the pressure of the high pressure line within the preset pressure range.

5. The cryocooler according to claim 4, wherein
  the buffer volume is configured to satisfy $VB \geq -VH+VL(PI-PL)/(PH-PI)$ for any temperature in a temperature range from the initial temperature to the cryogenic temperature where VB represents a volume of the buffer volume, VH represents a volume of the high pressure line, VL represents a volume of the low pressure line, PI represents a working gas filling pressure at a certain temperature, PH represents a pressure of the high pressure line in the steady operation at the certain temperature, and PL represents a pressure of the low pressure line in the steady operation at the certain temperature.

6. The cryocooler according to claim 1, further comprising:
  a buffer pressure sensor that measures a pressure of the buffer volume, wherein
  the controller is configured to complete the initial cooling based on the pressure of the buffer volume measured by the buffer pressure sensor.

7. A method for operating a cryocooler including an expander, a high pressure line which is connected to the expander and through which a working gas taken into the expander flows, a low pressure line which is connected to the expander and through which a working gas exhausted from the expander flows, a pressure sensor that measures a pressure of the high pressure line, a buffer volume, and a supply valve that connects the buffer volume to the low pressure line, the method comprising:
  executing initial cooling to cool the expander from an initial temperature to a cryogenic temperature; and
  executing a steady operation for maintaining the expander at the cryogenic temperature subsequent to the initial cooling, wherein
  the supply valve is controlled during the initial cooling based on the pressure of the high pressure line measured by the pressure sensor to keep the pressure of the high pressure line within a preset pressure range.

8. The method according to claim 7, further comprising:
  measuring a pressure of the buffer volume during the initial cooling; and
  completing the initial cooling based on the measured pressure of the buffer volume.

* * * * *